United States Patent [19]

Mandt

[11] 4,100,614

[45] Jul. 11, 1978

[54] METHOD FOR POLYMER DISSOLUTION

[75] Inventor: Mikkel G. Mandt, Cedar Falls, Iowa

[73] Assignee: Houdaille Industries, Inc., Buffalo, N.Y.

[21] Appl. No.: 697,580

[22] Filed: Jun. 18, 1976

[51] Int. Cl.² ............................ B01F 5/02; B01F 5/04; B01F 5/20
[52] U.S. Cl. .................................. 366/154; 366/159; 366/167
[58] Field of Search ...................... 259/95, 4 R, 18, 36, 259/145; 260/29.6 R

[56] References Cited

U.S. PATENT DOCUMENTS

| | | | |
|---|---|---|---|
| 3,166,020 | 1/1965 | Cook | 259/95 |
| 3,740,027 | 6/1973 | Kormos | 259/26 |
| 3,826,474 | 7/1974 | Pareja | 259/95 |
| 3,871,627 | 3/1975 | Marshall | 259/18 |
| 3,893,655 | 7/1975 | Sandiford | 259/95 |
| 4,007,921 | 2/1977 | Zingg | 259/95 |

Primary Examiner—Robert W. Jenkins
Attorney, Agent, or Firm—Fitch, Even, Tabin & Luedeka

[57] ABSTRACT

A method and apparatus for dissolution of comminuted organopolymeric materials such as water and waste water flocculant polymer, in which the polymer is educted into a series of ejector mixers and into a mixing zone.

4 Claims, 4 Drawing Figures

METHOD FOR POLYMER DISSOLUTION

Generally, the present invention is directed to dissolution of materials, and, more particularly, is directed to methods and apparatus for the dissolution of organopolymeric materials.

Relatively dilute solutions of organopolymeric materials such as high molecular weight polyelectrolytes are conventionally used as flocculants in the diversified field of water and waste water treatment, and substantial effort has been devoted to the preparation of the polymer stock solutions used for such purposes. Such organopolymeric materials are conventionally supplied in a dry, free-flowing, comminuted form such as a powder, and must be dissolved to produce an appropriate solution. However, the uniform dissolution of such materials may present various difficulties and may involve elements of skill and care. For example, such materials may tend to agglomerate (or "fish eye") if not properly mixed in aqueous solution, and inoptimal use of the polymer results. There are also potential problems of damage to the polymer from excessive mixing shear, and in any event, it is desirable to provide for relatively low levels of mixing energy requirement.

There is a need for effective, yet relatively simple methods and apparatus for dissolving free-flowing, comminuted solids such as water treatment polymers, and it is an object of the present invention to provide such methods and apparatus.

This and other objects of the present invention will become apparent from consideration of the following detached description and the accompanying drawing, of which:

Figure 1:
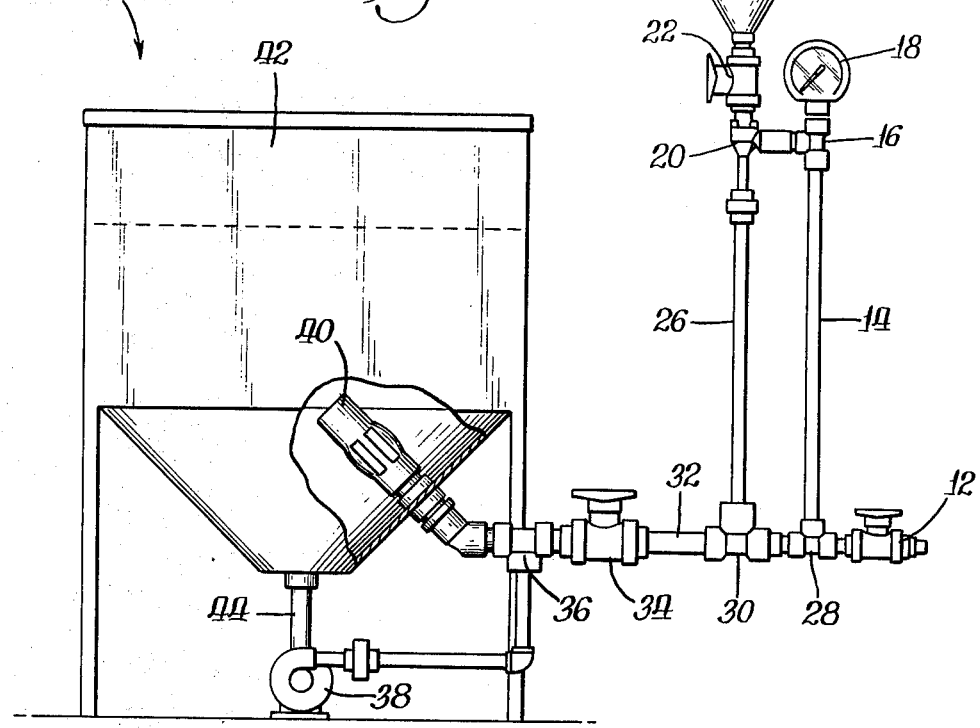
FIG. 1 is a side view, partially broken away, of an embodiment of organopolymeric polyelectrolyte dissolution apparatus in accordance with the present invention.
Figure 2:
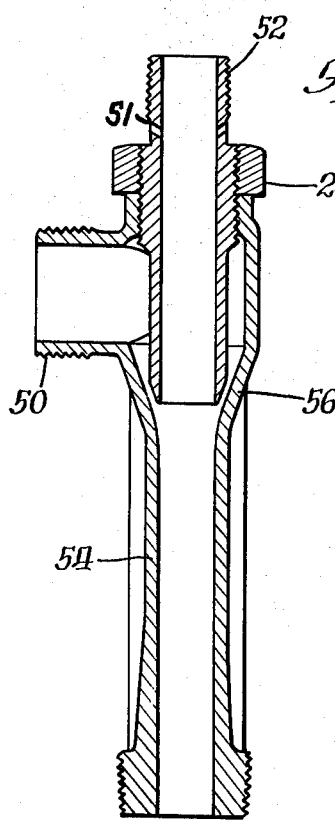
FIG. 2 is a cross-sectional side view of an embodiment of a polymer dispersing component of the apparatus of FIG. 1.

Generally, the present invention is directed to methods and apparatus for the uniform dissolution of an organopolymeric material in a liquid solvent for the organopolymeric material. The liquid will usually be water and as will be discussed, the water may be used directly at tap or other outlet pressure. The organopolymeric materials to be dissolved should be comminuted and free flowing, and in this connection, may have a particle size of less than about 1 mm. in the largest dimension. Preferably, the organopolymeric material is in dry, free-flowing powder form, and as indicated, the invention has particular applicability to the dissolution water and waste water treatment polymers. Such water and waste water treatment polymers are well known to the art, are a recognized commodity in commerce, and include cationic flocculants, anionic flocculants and non-ionic flocculants.

In accordance with the present method, a moving stream of the liquid solvent is formed from a liquid source having a pressure of at least about 10 psig., and the polymer is introduced into the interior of the moving stream to disperse the comminuted polymer and produce a liquid-polymer mixture (dispersion and/or solution). The fluid stream should best be formed from a liquid source having a pressure of less than 50 psig., and a pressure range of from about 30 to about 45 psig. is particularly preferred. Furthermore, the discharging fluid jet is advantageously formed in a hollow pattern such as an inverted conical pattern surrounding the introduction zone, so that the polymer can be introduced into a turbulent wetting zone without contacting a wetted surface. The liquid-polymer mixture mixed is with solvent liquid in mixing zones to produce a combined ejector discharge stream which is discharged within a mixing tank zone. A cascading series of ejector mixing zones may be advantageously provided, with the terminal ejector discharge being directed into the mixing tank zone. The maximum pressure of the total discharge stream entering the terminal ejector generally may be up to about 10 psig. The ratio of motive stream to secondary stream in the ejector mixing zones should best be in the range of from about 0.4 to about 1.6.

In carrying out the method, a predetermined amount of the polymer may be introduced into the wetting zone and the introduction of liquid into the mixing tank zone through the ejector system may be continued until a predetermined volume of liquid is in the mixing tank. The liquid in the tank may then be recirculated through at least the last stage of the ejector mixing system if appropriate to complete dissolution of the polymer and provide a uniform polymer solution.

Generally, apparatus of the present invention comprises means, such as a flocculant disperser for educting the comminuted polymer into a jet stream of a liquid solvent for the polymer to provide a liquid polymer mixture (dispersion and/or solution), a mixing tank, and terminal ejector mixing means, such as an eductor mixer, for educting liquid in the tank as a secondary stream and discharging into the mixing tank. The apparatus further includes means for supplying the terminal ejector mixing means with the liquid-polymer mixture as a motive stream. As indicated previously, the system advantageously includes multiply cascaded ejector mixing, and in this connection, the supply means may comprise at least one additional ejector mixer disposed to accept the liquid-polymer mixture from the polymer educting means as an input stream and liquid solvent for the polymer as another input stream. As also indicated previously, the ejector mixers should best have a ratio of motive stream to secondary stream in the range of from about 0.4 to about 1.6.

Turning now to the drawings, the present invention will now be described more particularly in respect of the embodiment of the invention shown in FIGS. 1-4. Illustrated in FIG. 1 is polymer dissolution apparatus 10 which comprises an inlet valve 12 connected to the source of pressurized water for the system, which will usually be pressurized tap water supply. The inlet valve 12 discharges to Tee 28, one outlet of which feeds conduit 14 which in turn provides the liquid motive stream for flocculant disperser 20 through Tee 16 and associated piping. A pressure gauge 18 is also mounted on Tee 16 for determining the inlet pressure to the flocculant disperser 20. The polymer powder is supplied to the flocculant disperser 20 by means of a funnel 24 into which the powder may be placed, and which discharges to the mixer 20 through polymer control valve 22. The flocculant disperser 20 is shown in more detail in FIG. 2, which is a cross-sectional drawing of the disperser showing the motive stream inlet 50 (which is supplied with pressurized water from Tee 16) polymer powder inlet 52 and discharge outlet and mixing zone 54. Water, which enters the inlet 50, forms a jet sheath in the form of a hollow inverted turbulent cylinder into which the dry free-flowing polymer powder may be directly introduced through powder inlet 52, without coming into substantial direct contact with the wall of the mixing zone 56. In this connection, the flared portion of the housing of the illustrated disperser at numeral 56, which in combination with the downstream end of the inlet tube 52 forms an inwardly flared, hollow cylindrical nozzle from which the hollow jet stream shroud issues, has been provided with a gradual inward flare having a radius greater than the internal diameter of the discharge conduit at the neck of the flared zone. The provision of this modification to a commercially marketed flocculant disperser (which has a more abrupt, funnel-like shape) reduces the potential for polymer clogging from adherence to wetted interior walls of the disperser. It will be appreciated that air will tend to be carried along with the polymer powder into the disperser 20 and will be educted into and mixed in the hollow jet stream with the polymer powder to become a part of the discharge stream. When the charge of polymer in the funnel 24 has been consumed, it may be desirable to close the polymer control valve 22 to reduce the intake of air into the system. However, the eduction vacuum of the disperser may be advantageously utilized to prevent backspray in the system, and in this connection, the polymer inlet 52 is provided with inwardly and downwardly directed orifices 51, educted flow of air through which serves to control undesirable backspray in the system.

Figure 3:
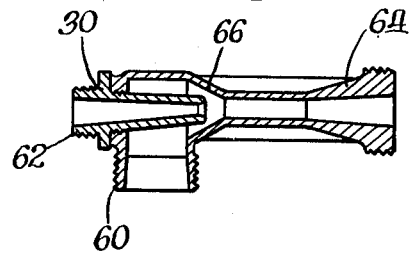
FIG. 3 is a cross-sectional side view of an embodiment of a jet ejector component of the apparatus of FIG. 1.
Figure 4:
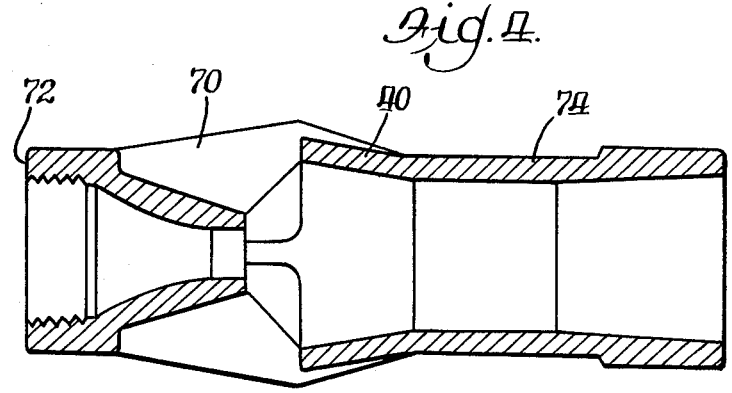
FIG. 4 is a cross-sectional side view of an embodiment of a circulating tank eductor component of the apparatus of FIG. 1.

The polymer powder and the input water are vigorously mixed in the mixing and discharge section 54 of the disperser 20 and the resulting discharge stream is conducted by means of conduit 26 to the secondary stream input 60 of ejector mixer 30, which is shown in more detail in FIG. 3. The motive stream inlet to the ejector mixer 30 supplied under pressure to ejector inlet and nozzle 62 from the other outlet of Tee 28. In the ejector mixer 30, the water-polymer mixture from the disperser 20 is vigorously mixed with additional water from the supply source. The ejector mixer should best be designed to operate at a mixing ratio of motive stream to secondary stream of from about 0.4 to about 1.6, and in the illustrated embodiment the operational ratio is about 1:1. The polymer-liquid stream output from the discharge end 64 of the ejector mixer 30 is conducted by suitable conduit including a valve 34 and Tee 36 to an eductor 40 located within a polymer mixing tank 42. The eductor 40, which functions as the terminal ejector mixer in the system, is shown in more detail in the cross-sectional view of FIG. 4 and has an input nozzle 72 which is supplied with pressurized liquid-polymer mixture from ejector mixer 30 to provide the motive stream. The nozzle 72 discharges into a mixing and discharge zone 74, which is also adapted to be supplied with secondary stream liquid from the tank through inlets 70, and the vigorously mixed motive and secondary streams are discharged into the tank 42. Like the ejector mixer 30, the eductor 40 should best have a mixing ratio of primary to secondary stream flow in the range of from about 0.4 to about 1.6, and in the illustrated embodiment, a ratio of about 1.1 is utilized. In the illustrated embodiment, the bottom of the tank 42 is conical and the eductor 40 is mounted therein at an angle of about 45° to the horizontal plane to produce a vertical mixing component in the tank.

In operation, a predetermined amount of polymer may be educted into the system by means of the disperser 20, polymer control valve 22 may be closed, and the flow of input water continued until the tank has been filled to a predetermined level indicative of a desired polymer solution concentration. In this connection, the high intrinsic viscosity of conventional flocculant materials is a limiting factor on solution concentration, and for many such materials, the solution will not usually exceed about 0.5 weight percent.

After the tank has been filled to a desired level, the input flow of water may be turned off (at valve 12), and the valve 34 preceding the terminal tank ejector mixer 40 may also be closed to permit recirculation of the liquid in the tank through the eductor 40, via outlet pipe 44, pump 38 and conduit to Tee 36. The appropriate valve closings and pump activation may be carried out manually, or by automated means activated by a tank level indicator. This recirculation may be employed to complete dissolution of hard-to-dissolve high molecular weight polymers (such as nonionic flocculant polymers which may require a "curing time" under mixing conditions before being utilized in water and waste water treatment.

After a homogeneous solution has been prepared in the tank 42, it may be metered directly to treatment apparatus or transferred to storage. In connection with such subsequent pumping operations, it is noted that the level of the disperser 20 is located well above the final polymer solution surface (shown by dotted line) so that back flow to the disperser is prevented. The pump which is seated under the tank may, through appropriate piping, serve a dual purpose for the discharge of the polymer solution, as well as for the recirculation of polymer solution through the circulating tank eductor 40. In connection with the operation and use of the system, it is noted that the apparatus is relatively easy to install at a relatively low total cost. The use of cascaded ejector mixers following the flocculant disperser, such that an ejector is used following the disperser to pump the dispersed mixture into the tank and help to increase the capability of the disperser's suction lift for inducting the polymer powder, provides for effective operation and thorough mixing at relatively low input pressures; input pressures should not be too high in the dissolution of high molecular weight polymers or the resultant high shear may degrade the polymer. The system is capable of providing solutions without concentration gradients, fisheyes, agglomerates or pockets of chemical. The system requires little maintenance and may be easily cleaned.

If extra curing time is required, an optional recycling pump can provide additional long term tank mixing. The recycle pump can also be utilized to transport the finished solution to additional optional holding tank. In order to further illustrate the system, a series of runs are conducted utilizing apparatus like that illustrated in FIGS. 1-4 and having the following component configuration:

| | |
|---|---|
| Mixing (holding) tank 42 | 70 gal., PVC |
| Polymer holding funnel 24 | 13" dia., PVC |
| Flocculant disperser 20 | Penberthy 62 DP, ¾" |
| Hydraulic ejector 30 | Penberthy 64 A, 1-½" |
| Circulating tank eductor 40 | Penberthy 1-½" |
| Polymer control valve 22 | Ball type, PVC, ¾" |
| Water inlet control valve 12 | Gate type, brass, ¾" |

-continued

| | |
|---|---|
| Recirculation control valve 34 | Gate type, brass, ¾" |
| Water inlet pressure gauge | 4" dia., 0-60 PSI |
| Nozzle pressure gauge 18 | 2-½" dia., 0-30 PSI |
| Pipes and fittings | ¾", PVC, schedule 80 |
| Centrifugal pump 38 | March Mfg. Co. Model AC-5C-MD |

These components are commercially available, with the exception of a modified flocculant dispenser 20 having a gradual discharge tube neck flare of a generally toroidal surface with a minor radius of 1 inch, which is used in some of the runs.

During these runs, different polymer solution concentrations, (0.1 to 0.5%) are selected, and the corresponding amount of dry polymer are weighted and stored in the polymer holding funnel 24 with control valve 22 closed. The volume of polymer solution is set for 50 gallons. According to the testing schedule, water inlet pressure is chosen in the range of 30-50 psig. To begin with, the water inlet control valve is opened to the desired pressure and water is fed to the tank. When water reaches the eductor level, the polymer control valve is opened. The dry polymer is educted into the system through the disperser 20. The polymer control valve is closed when polymer feeding is finished so that entrained air will be kept to a minimum. Pressurized water flow is maintained through the inlet pipe to make up the water level to 50 gallons. The centrifugal pump system is used, if necessary, to recirculate the polymer solution through the circulating tank eductor until residual polymer is fully dissolved.

For a typical run, water inlet pressure, nozzle pressure, room temperature, water temperature, feed rate, mixing time, recirculation time, and percentage solution made, are measured. Jar tests are also conducted to check the performance of the solution, and the physical properties of the polymer solutions, such as specific gravity and pH are measured.

The tests are conducted with four different types of water treatment polymers sold by American Cyanamid Company under the name Magnifloc. Information in connection with the Magnifloc polymers is shown in Table 1.

TABLE I

| FLOCCULANT PROPERTIES SUMMARY | | | | |
|---|---|---|---|---|
| FLOCCULANT TYPE | 560C | 820A | 835A | EP-721 |
| Appearance | White Powder | White Powder | White Powder | White Powder |
| Molecular Weight | — | $6 \times 10^6$ | $15 \times 10^6$ | — |
| Category | Cationic | Anionic | Anionic | Non-ionic |
| Degree of Charge | — | High | High | None |
| Bulk Density (lb/ft$^3$) | 38 | | 43-45 | — |
| pH of 0.5% soln at 25° C | 5.5 | 3.6 | 7.0 | — |
| Viscosity (cps) at 20° C/25° C | | | | |
| % Solution: | | | | |
| 0.1 | | 11 | 13/40 | 90/450 |
| 0.25 | | — | 45 | 1,350 |
| 0.5 | | 78 | 92/65 | 650/3,300 |
| 1.0 | | 440 | 540/160 | 2000/10,000 |

Minimum water inlet pressure is tested in the initial runs to obtain a minimum workable water inlet pressure to prevent "fish-eyes" in the polymer solution for this equipment and the indicated polymer products. A minimum of 30 PSI water pressure appears workable to prevent "fish-eyes" in the polymer. Other runs were conducted by an increment of 5 PSI each until 50 PSI was reached.

In order to evaluate whether the polymer might be degraded, jar tests are conducted. The turbidity in Jackson turbidity unit of a prepared raw water sample treated by disperser mixed polymer solution at 1 PPM concentration is usually lower than that of a standard polymer solution which is prepared by vortex mixing. It appears that the turbidity level of the treated raw water increases as the disperser water inlet pressure is increased to prepare the polymer solution. In other words, polymer has apparently experienced stronger shearing due to the increased water inlet pressure during preparation.

For preparation of polymer solution of Magnifloc 835A and 560C, a higher tip speed centrifugal pump is also tested in use before the ejector pump. The purpose is to see if polymer could be damaged by a higher tip speed (59 fps) centrifugal pump. The Jar test results show that no significant damage has occurred as appears in Table III.

Results of these mixing runs are presented in Table II, and the Jar tests are summarized in Table III, as follows:

TABLE II

| POLYMER MIXING: DATA SUMMARY | | | | | | | | | | | | |
|---|---|---|---|---|---|---|---|---|---|---|---|---|
| NO. RUN | POLYMER | % SOLN | TW °F | PW PSI | PN PSI | TM MIN | TC MIN | PC PSI | FP LB/MIN | SP.GR. | pH | NOTE |
| 1 | EP-721 | 0.1 | 58 | 25 | 7 | 7 | 60 | 7 | | | | a,# |
| 2 | EP-721 | 0.1 | 63 | 35 | 9 | 6 | 74 | 7 | | | | a,# |
| 3 | 835A | 0.25 | 62 | 35 | 7 | 6 | | 5 | | | | a,# |
| 4 | EP-721 | 0.25 | 65 | 34 | 8 | 5 | 58 | 7 | | | | a,* |
| 5 | 560C | 0.25 | 60 | 25 | 7 | 5 | 16 | 6 | | | | a,* |
| 6 | 820A | 0.25 | 63 | 25 | 7 | 6 | 42 | 5 | | | | a,# |
| 7 | 835A | 0.25 | 60 | 30 | 7 | 3 | 10 | 2 | 4.17 | | | b |
| 8 | 835A | 0.25 | 59 | 30 | 7 | 4 | 10 | 2.5 | 4.17 | | | b |
| 9 | 835A | 0.1 | 60 | 30 | 7 | 5 | | | 6.25 | | | b |
| 10 | 835A | 0.2 | 61 | 30 | 7 | 4 | 20 | 2.5 | 5.00 | 1.002 | | b,* |
| 11 | 835A | 0.2 | 63 | 30 | 7 | 3 | 15 | 2 | 0.88 | 1.002 | | b,* |
| 12 | 835A | 0.2 | 62 | 29 | 12 | 3 | 10 | 2.5 | 2.38 | | | c,* |
| 13 | 835A | 0.2 | 63 | 40 | 12 | 3 | | | 0.83 | 1.000 | | c,* |
| 14 | 835A | 0.3 | 65 | 30 | 10 | 3 | 8 | 2 | 2.50 | 1.002 | | c |
| 15 | 835A | 0.4 | 66 | 30 | 10 | 3 | 5 | 2 | 2.45 | 1.005 | | c |
| 16 | 835A | 0.5 | 64 | 30 | 10 | 3 | | | 1.55 | | | c |
| 17 | 835A | 0.2 | 61 | 30 | 7 | 4 | 10 | 2 | 3.57 | 1.002 | | c,d |

TABLE II-continued
POLYMER MIXING: DATA SUMMARY

| NO. RUN | POLYMER | % SOLN | TW °F | PW PSI | PN PSI | TM MIN | TC MIN | PC PSI | FP LB/MIN | SP.GR. | pH | NOTE |
|---|---|---|---|---|---|---|---|---|---|---|---|---|
| 18 | 835A | 0.3 | 64 | 30 | 8 | 6 | | | 1.98 | 1.002 | | c,d |
| 19 | 835A | 0.3 | 63 | 30 | 7 | 4 | | | 1.35 | 1.002 | | c,d |
| 20 | 835A | 0.5 | 61 | 30 | 8 | 5 | | | 2.50 | | | c,d |
| 21 | 835A | 0.2 | 65 | 35 | 8 | 4 | | | 1.78 | 1.000 | 7.1 | c,d |
| 22 | 835A | 0.3 | 65 | 35 | 8 | 6 | | | 0.75 | 1.000 | 7.3 | c,d |
| 23 | 835A | 0.4 | 61 | 35 | 14 | 5 | | | 0.87 | 1.005 | 7.15 | c,d |
| 24 | 835A | 0.2 | 68 | 40 | 9 | 3 | | | 1.17 | 1.000 | 7.15 | c,d |
| 25 | 835A | 0.3 | 64 | 40 | 9 | 4 | | | 0.75 | 1.005 | 7.3 | c,d |
| 26 | 835A | 0.4 | 61 | 40 | 8 | 5 | | | 3.72 | 1.005 | 7.2 | c,d |
| 27 | 835A | 0.2 | 67 | 45 | 10 | 4 | | | 2.00 | 1.000 | 7.15 | c,d |
| 28 | 835A | 0.3 | 64 | 45 | 10 | 4 | | | 1.78 | 1.005 | 7.25 | c,d |
| 29 | 835A | 0.4 | 68 | 45 | 10 | 4 | | | 1.65 | 1.005 | 7.25 | c,d |
| 30 | 835A | 0.2 | 64 | 50 | 11 | 4 | | | 1.73 | 1.000 | 7.3 | c,d |
| 31 | 835A | 0.3 | 69 | 50 | 11 | 3 | | | 1.63 | 1.000 | 7.4 | c,d |
| 32 | 835A | 0.4 | 68 | 50 | 11 | 4 | | | 1.45 | 1.000 | 7.35 | c,d |
| 33 | 560C | 0.2 | 62 | 30 | 7 | 5 | | | 2.43 | 1.000 | 7.0 | c,d |
| 34 | 560C | 0.3 | 64 | 30 | 7 | 5 | | | 2.90 | 0.999 | 6.85 | c,d |
| 35 | 560C | 0.4 | 64 | 30 | 10 | 5 | | | 1.43 | 0.999 | 6.70 | c,d |
| 36 | 560C | 0.2 | 65 | 35 | 11 | 4 | | | 0.92 | 1.000 | 7.05 | c,d |
| 37 | 560C | 0.3 | 63 | 35 | 7 | 4 | | | 1.47 | 1.000 | 6.85 | c,d |
| 38 | 560C | 0.4 | 63 | 35 | 8 | 4 | | | 1.75 | 1.000 | 6.75 | c,d |
| 39 | 560C | 0.2 | 61 | 40 | 9 | 4 | | | 1.43 | 1.000 | 7.00 | c,d |
| 40 | 560C | 0.3 | 62 | 40 | 9 | 4 | | | 1.42 | 1.000 | 6.90 | c,d |
| 41 | 560C | 0.4 | 61 | 40 | 9 | 4 | | | 2.23 | 1.000 | 6.7 | c,d |
| 42 | 560C | 0.2 | 63 | 45 | 10 | 3 | | | 1.57 | 1.000 | 7.00 | c,d |
| 43 | 560C | 0.3 | 61 | 45 | 10 | 3 | | | 1.88 | 1.000 | 6.85 | c,d |
| 44 | 560C | 0.4 | 63 | 45 | 10 | 4 | | | 1.97 | 1.000 | 6.85 | c,d |
| 45 | 560C | 0.2 | 66 | 50 | 11 | 3 | | | 1.35 | 1.000 | 7.00 | c,d |
| 46 | 560C | 0.3 | 63 | 50 | 11 | 4 | | | 1.57 | 1.000 | 6.90 | c,d |
| 47 | 560C | 0.4 | 61 | 50 | 11 | 3 | | | 1.43 | 1.000 | 6.80 | c,d |
| 48 | 820A | 0.2 | 65 | 30 | 0 | 4 | 15 | 3 | 2.50 | 1.000 | 5.85 | b,e |
| 49 | 820A | 0.3 | 63 | 30 | 0 | 3 | 15 | 2 | 1.62 | 1.000 | 5.35 | b,e |
| 50 | 820A | 0.4 | 62 | 30 | 0 | 3 | 10 | 2 | 3.15 | 1.020 | 5.0 | b,e |
| 51 | 820A | 0.2 | 60 | 35 | 0 | 3 | 15 | 3 | 3.83 | 1.000 | 5.75 | b,e |
| 52 | 820A | 0.3 | 61 | 35 | 0 | 3 | 10 | 2 | 2.68 | 1.000 | 5.3 | b,e |
| 53 | 820A | 0.4 | 60 | 35 | 0 | 3 | 10 | 2 | 2.38 | 1.000 | 5.0 | b,e |
| 54 | 820A | 0.2 | 61 | 40 | 0 | 3 | 15 | 3 | 2.00 | .995 | 5.75 | b,e |
| 55 | 820A | 0.3 | 60 | 40 | 0 | 3 | 10 | 2 | 2.20 | 1.000 | 5.25 | b,e |
| 56 | 820A | 0.4 | 62 | 40 | 0 | 3 | 7 | 2 | 2.50 | 1.000 | 5.1 | b,e |
| 57 | 820A | 0.2 | 63 | 45 | 0 | 2 | 9 | 3 | 2.08 | 1.000 | 5.6 | b,e |
| 58 | 820A | 0.3 | 60 | 45 | 0 | 2 | 10 | 2.5 | 2.41 | 1.000 | 5.3 | b,e |
| 59 | 820A | 0.4 | 58 | 45 | 0 | 2 | 10 | 2 | 2.47 | 1.000 | 5.0 | b,e |
| 60 | 820A | 0.2 | 65 | 50 | 0 | 4 | 10 | 2 | 2.08 | 1.000 | 5.6 | b,e |
| 61 | 820A | 0.3 | 60 | 50 | 0 | 2 | 10 | 2 | 2.32 | 1.000 | 5.3 | b,e |
| 62 | 820A | 0.4 | 57 | 50 | 0 | 2 | 10 | 2 | 2.43 | 1.000 | 5.0 | b,e |

NOTES:
<sup>a</sup>use ¾ eductor at 45° angle
<sup>b</sup>use 1-½ eductor at 45° angle
<sup>c</sup>use 1-½ eductor at horizontal position
<sup>d</sup>start using a higher tip speed centrifugal pump in line
<sup>e</sup>pilot system revision
<sup>f</sup>fish eyes appear after mixing
<sup>*</sup>massy polymer gum accumulated at dead area of tank bottom NOMENCLATURE:
PW: water inlet pressure, PSI
TW: water temperature, °F
PN: nozzle pressure, PSI
TM: mixing time, min.
TC: circulation time, min.
PC: circulation pressure, PSI
FP: dry polymer feed rate, lb/min.
SP.gr.: specific gravity of polymer solution
pH: pH of polymer solution

TABLE III

| Polymer Type | % Soln | Water Pressure PSI | Dosage Level PPM | Turbidity STD JTU | Turbidity TNKMX JTU | RAW* JTU |
|---|---|---|---|---|---|---|
| 835A | 0.2 | 30 | .4 | 60 | 63 | 150 |
| 835A | 0.3 | 30 | .3 | 120 | 65 | 170 |
| 835A | 0.5 | 30 | .5 | 53 | 45 | 70 |
| 835A | 0.2 | 35 | .4 | 128 | 100 | 150 |
| 835A | 0.3 | 35 | .3 | 205 | 185 | 280 |
| 835A | 0.4 | 35 | .4 | 100 | 75 | 110 |
| 835A | 0.2 | 40 | .4 | 143 | 135 | 400 |
| 835A | 0.3 | 40 | .9 | 93 | 95 | 400 |
| 835A | 0.4 | 40 | .4 | 70 | 55 | 35 |
| 835A | 0.2 | 45 | .9 | 115 | 70 | 450 |
| 835A | 0.3 | 45 | .9 | 115 | 93 | 380 |
| 835A | 0.4 | 45 | .8 | 178 | 113 | 490 |
| 835A | 0.2 | 50 | .9 | 108 | 75 | 340 |
| 835A | 0.3 | 50 | .9 | 145 | 123 | 500 |
| 835A | 0.4 | 50 | .8 | 125 | 120 | 490 |
| 560C | 0.2 | 30 | .8 | 73 | 48 | 200 |
| 560C | 0.3 | 30 | .9 | 45 | 55 | 110 |
| 560C | 0.4 | 30 | .8 | 35 | 58 | 110 |
| 560C | 0.2 | 35 | .8 | 60 | 43 | 110 |
| 560C | 0.3 | 35 | .9 | 55 | 50 | 100 |
| 560C | 0.4 | 35 | .8 | 55 | 53 | 120 |
| 560C | 0.2 | 40 | .8 | 48 | 48 | 140 |
| 560C | 0.3 | 40 | .9 | 55 | 50 | 130 |
| 560C | 0.4 | 40 | .8 | 43 | 58 | 120 |
| 560C | 0.2 | 45 | .8 | 55 | 68 | 140 |
| 560C | 0.3 | 45 | .9 | 45 | 60 | 110 |
| 560C | 0.2 | 50 | 1.0 | 45 | 43 | 120 |
| 560C | 0.4 | 45 | .8 | 55 | 50 | 220 |
| 560C | 0.3 | 50 | .9 | 50 | 83 | 310 |
| 560C | 0.4 | 50 | 1.0 | 88 | 63 | 330 |
| 820A | 0.2 | 30 | 1.0 | 23 | 18 | 100 |
| 820A | 0.3 | 30 | 1.0 | 25 | 20 | 100 |
| 820A | 0.4 | 30 | 1.0 | 15 | 10 | 60 |
| 820A | 0.2 | 35 | 1.0 | 38 | 33 | 85 |
| 820A | 0.3 | 35 | 1.0 | 40 | 25 | 70 |
| 820A | 0.4 | 35 | 1.0 | 38 | 25 | 115 |
| 820A | 0.2 | 40 | 1.0 | 38 | 38 | 140 |
| 820A | 0.3 | 40 | 1.0 | 25 | 28 | 140 |

TABLE III-continued

| Polymer Type | % Soln | Water Pressure PSI | Dosage Level PPM | Turbidity STD JTU | TNKMX JTU | RAW* JTU |
|---|---|---|---|---|---|---|
| 820A | 0.4 | 40 | 1.0 | 55 | 33 | 105 |
| 820A | 0.2 | 45 | 1.0 | 38 | 35 | 150 |
| 820A | 0.3 | 45 | 1.0 | 20 | 18 | 115 |
| 820A | 0.4 | 45 | 1.0 | 28 | 23 | 150 |
| 820A | 0.2 | 50 | 1.0 | 13 | 18 | 120 |
| 820A | 0.3 | 50 | 1.0 | 15 | 13 | 80 |
| 820A | 0.4 | 50 | 1.0 | 33 | 28 | 200 |

STD = Raw water treated by standard prepared polymer solution
TNKMX = Raw water treated by tank mixed polymer solution
JTU = Jackson turbidity unit (Based on Hach Turbidity meter)
RAW* = Raw water without polymer dosage The Jar tests are used as comparative tests made to check the performance, and degradation or damage, if any, of polymer caused by the mixing process.

In the Jar testing of Table III, a standard 0.2% polymer solution is mixed in a beaker with a magnetic stirrer, and it is assumed no damage is done to the polymer. This standard solution is prepared by adding 0.1g of polymer to 50 ml of distilled water in a beaker. The water is first stirred. The polymer is slowly added on the edge of the vortex made by the stirring action. The mixture is stirred until all the polymer is mixed and dissolved.

Then artificial raw water samples are prepared by weighing out six portions of 0.5g of colloidal Kaolin clay and dumping each into a 1500 ml beaker. One liter of tap water is poured into each of the beakers, and each of the beakers is stirred with the magnetic stirrer until all the clay is in suspension.

The beakers are placed under a gang stirrer with stirring bars at 100 RPM. A 5% solution of alum is added to each beaker; for polymers 835A and 560C, 1cc is added, and for 820A, 2cc is added. The polymer solution is now added at the same 100 RPM speed. The 0.2% standard polymer solution is added to two beakers, the tank mixed polymer solution is added to two beakers, and no polymer is added to the last two beakers. The first four beakers must be given the same dosage, usually 1.0 ppm. (This means adding 0.5cc of standard solution and an amount of tank mixed solution depending on its concentration. After solution is added to the last beaker, they are stirred for one minute at 100 RPM, one more minute at 40 RPM and another minute at 15 RPM. The gang stirrer is then turned off, and the floc is allowed to settle for 3-5 minutes, and the turbidity data taken.

It is noted that it generally takes at least an hour to provide a well mixed polymer solution by the vortex method in a beaker, and may take only about 15 minutes by the ejector mixing system. Dry polymer is introduced into the flocculant disperser of the illustrated system by gravity and disperser suction, and as previously indicated, a flocculant disperser design modification may provide enhanced performance.

A series of runs is made with the test apparatus using a conventional Penberthy 62 flocculant disperser which has a funnel shaped cone interior surface (nozzle throat) between the nozzle jet orifice and the neck of the discharge tube. The feeding rate in the runs is calculated by dividing the total amount of polymer used by the total polymer feeding time. Runs are also conducted with the modified flocculant disperser in which this inwardly converging surface more gradually bends to fit the inside diameter of the discharge tube (a toroidal surface, 1 inch minor radius).

Polymer feed rates for flocculant Magnifloc 835A and 560C have wide fluctuations for the conventional disperser as indicated in Tables IV and V with different polymer concentrations, and at various water inlet pressures, and polymer may tend to accumulate on the throat of the disperser. Improved uniformity of polymer feed rate for Magnifloc 820A and EP-721 by using the modified disperser is shown in Tables VI and VII.

TABLE IV

Magnifloc 835A Polymer Feed Rate (lb/min)
Disperser Water Inlet Pressure, PSI

| % Polymer Solution | 30 | 35 | 40 | 45 | 50 |
|---|---|---|---|---|---|
| 0.2 | 3.57 | 1.78 | 1.13 | 2.00 | 1.73 |
| 0.3 | 1.97 | 0.75 | 0.75 | 1.78 | 1.63 |
| 0.4 | 2.43 | 0.87 | 3.7 | 1.65 | 1.45 |

TABLE V

Magnifloc 560C Polymer Feed Rate (lb/min)
Disperser Water Inlet Pressure, PSI

| % Polymer Solution | 30 | 35 | 40 | 45 | 50 |
|---|---|---|---|---|---|
| 0.2 | 2.43 | 0.92 | 1.43 | 1.57 | 1.35 |
| 0.3 | 2.88 | 1.50 | 1.42 | 1.88 | 1.57 |
| 0.4 | 1.43 | 1.75 | 2.22 | 1.97 | 1.43 |

TABLE VI

Magnifloc 820A Polymer Feed Rate (lb/min)
Disperser Water Inlet Pressure, PSI

| % Polymer Solution | 30 | 35 | 40 | 45 | 50 |
|---|---|---|---|---|---|
| 0.2 | 2.5 | 1.0 | 2.0 | 2.1 | 2.1 |
| 0.3 | 1.6 | 1.5 | 2.2 | 2.4 | 2.3 |
| 0.4 | 1.8 | 2.4 | 2.5 | 2.5 | 2.4 |

TABLE VII

Magnifloc EP-721 Polymer Feed Rate

| % POLYMER SOLUTION | FEED RATE (lb/min) | CIRCULATION TIME (min) |
|---|---|---|
| 0.1 | 1.25 | 87 |
| 0.2 | 1.98 | 95 |
| 0.25 | 1.25 | 100 |
| 0.3 | 1.67 | 110 |
| 0.4 | 1.68 | 120 |

It will be appreciated that method and apparatus for dissolution of polymers which are relatively simple, have minimal power consumption, and provide an effective and homogeneous polymer solution have been provided through the present invention.

While the invention has been particularly described with respect to specific embodiments it will also be appreciated that various modifications and adaptations will become apparent in view of the present disclosure, and such modifications and adaptations are intended to be included within the spirit and scope of the appended claims.

Various of the features of the invention are set forth in the following claims.

What is claimed is:

1. In a method for uniformly dissolving a predetermined amount of comminuted organopolymeric water and waste water flocculent in a predetermined amount of water to provide an aqueous flocculent polymer solution containing about .5 percent or less by weight of the flocculent polymer, including the step of introducing the organopolymer flocculent into the interior of a hollow liquid jet of water formed from a pressurized source having a pressure of at least 10 psig. and dispersing the organopolymer flocculent therein to provide a liquid-polymer mixture stream, the improvement comprising subjecting the liquid-polymer mixture stream to ejector mixing in a first ejector mixing zone in which a motive stream of water from a pressurized source having a pressure of at least 10 psig. is provided, and in which said liquid-polymer mixture stream is the educted, secondary stream from said first ejector mixing zone, the ratio of said motive water stream to said secondary polymer mixture being in the range of from about 0.4 to about 1.6, to provide an ejector mixed stream, discharging said ejector mixed stream at a feed pressure of about 10 psig. or less through a second ejector mixing zone as a second motive stream into a tank mixing zone of predetermined volume, said second motive stream serving to educt polymer solution from said tank mixing zone as a secondary stream at a ratio of second motive stream to said tank zone secondary stream in the range of from about 0.4 to about 1.6, and to provide fluid mixing in said tank mixing zone.

2. A method in accordance with claim 1 wherein said flocculent polymer is selected from the group consisting of anionic flocculents, cationic flocculents, and non-ionic flocculents.

3. A method in accordance with claim 2 wherein a single pressurized water source supplies both said hollow liquid flocculent dispersing jet and said first ejector zone motive stream, and wherein said single pressurized source is provided at a pressure of less than about 50 psig.

4. A method in accordance with claim 3 wherein said single pressurized source is provided at a pressure in the range of from about 35 to about 45 psig, wherein said tank mixing zone is provided with a conical surface, and wherein said second ejector mixing zone discharges adjacent said conical surface to provide a vertical mixing component in said tank zone.

* * * * *